2,968,684
COMBINATION ALKYLATION-ISOMERIZATION PROCESS

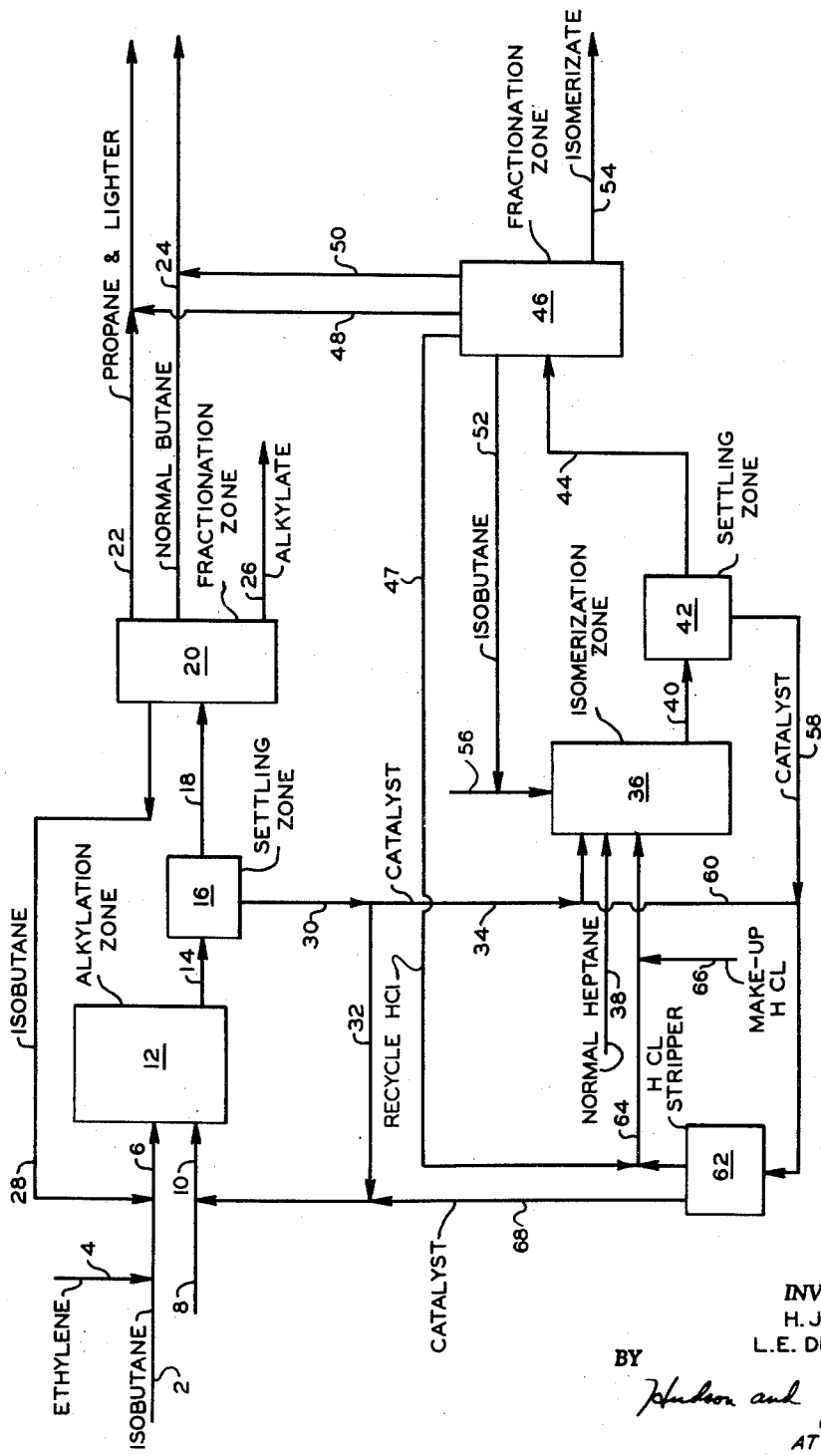

Harold J. Hepp and Lewis E. Drehman, Bartlesville, Okla., assignors to Phillips Petroleum Company, a corporation of Delaware Filed June 16, 1958, Ser. No. 742,257

12 Claims. (Cl. 260—683.57)

This invention relates to a combination alkylation and isomerization process. In one aspect it relates to a process for the alkylation of isobutane with an olefin and the isomerization of a normal paraffin, such as, normal pentane, normal hexane and/or normal heptane, in the presence of isobutane utilizing a common aluminum halide-hydrocarbon complex catalyst.

Aluminum halide-hydrocarbon complex catalysts are used in many commercial hydrocarbon processes, such as, alkylation, isomerization and polymerization. While very effective in promoting the desired hydrocarbon reactions these catalysts have certain disadvantages, one of which lies in the fact that the catalysts become less active through use and must be fortified or regenerated at intervals. One method of controlling catalyst activity which is widely used is to introduce fresh aluminum halide (or hydrogen halide as required) to the system and withdraw spent catalyst, which is either discarded or regenerated to recover the aluminum halide and hydrogen halide. Since the reactions which are promoted by the catalyst complex frequently do not require a catalyst of the same activity it has been suggested to use the catalyst consecutively in two or even three different operations, each requiring a progressively less active catalyst. However, even if this economizing expedient is practiced, at some point in the process it becomes necessary to either fortify the catalyst, regenerate it, or discard it and introduce fresh catalyst to the system.

It is an object of this invention to provide an improved process for the utilization of aluminum halide-hydrocarbon complex catalyst.

Another object of this invention is to provide an improved combination, alkylation-isomerization process utilizing aluminum halide-hydrocarbon complex catalyst.

Still another object of the invention is to provide an improved combination alkylation-isomerization process utilizing aluminum halide-hydrocarbon complex catalyst wherein catalyst fortification and regeneration are reduced.

Yet another object of the invention is to provide an improved process for the alkylation of ethylene with isobutane and the isomerization of $C_5$ to $C_7$ alkanes in the presence of isobutane, utilizing a common aluminum chloride-hydrocarbon complex catalyst.

These and other objects of the invention will become more readily apparent from the following detailed description and discussion.

The foregoing objects are realized broadly by utilizing a common aluminum halide-hydrocarbon complex catalyst to alkylate isobutane with ethylene and to isomerize an alkane having 5 to 7 carbon atoms in the presence of isobutane, and providing at least a quantity of isobutane in the isomerization reaction sufficient to maintain the activity of the catalyst in the alkylation reaction at a predetermined level.

In one aspect of the invention isobutane is alkylated with ethylene and normal heptane is isomerized in the presence of isobutane, both operations being carried out in the presence of a common aluminum chloride-hydrocarbon complex utilizing an isomerization feed having an isobutane-to-heptane ratio of at least 1.1 to 1.

The isomerization of $C_5$ to $C_7$ alkane in the presence of isobutane utilizing an aluminum halide-hydrocarbon complex catalyst is preferably carried out at a temperature in the range of about 30 to about 150° F. and under a pressure sufficient to maintain the reactants in the liquid phase. The reaction may be carried out over a period of several hours, however, the preferred range of reaction time is from about 10 minutes to about 2 hours. The reaction rate and the conversion of the hydrocarbon feed is dependent on the amount of aluminum halide in the aluminum halide-hydrocarbon complex. Usually it is desirable that the catalyst complex should contain between about 60 and about 70 percent aluminum halide, however, the quantity of aluminum halide in the complex can be varied over wide ranges to provide a corresponding range of feed conversion. While the overall activity of the catalyst is established by the aluminum halide content the presence of hydrogen halide is required to provide the high activity. Usually the quantity of hydrogen halide present is between about 2 and about 6 percent by weight of the feed with about 4 weight percent being preferred. The hydrocarbon to catalyst ratio is also a factor in the isomerization reaction rate and this ratio is maintained between about 0.8:1 and about 5:1, preferably between about 1.5:1 and about 3:1.

It is preferred that the feed to the isomerization reaction contain the minimum amount of aromatics and naphthenes. In the absence of these materials it is possible to carry out the isomerization reaction at relatively low temperatures. Aromatics are particularly undesirable since they can, if present, be carried into the alkylation zone in the catalyst complex and can react with the ethylene contained therein. Although the isomerization reaction can be carried out in the presence of limited amounts of aromatics, in the combination process, it is especially desirable to maintain aromatics at as low a concentration as possible.

The isomerization reaction is usually carried out in a mechanically stirred reaction vessel which is operated under sufficient pressure to maintain liquid phase. Stirring is provided to cause intimate contact of the catalyst and hydrocarbon phases and promotes the isomerization reaction. Other reactors, such as, jet agitated reactors can also be used. The catalyst is aluminum halide-hydrocarbon complex in which the aluminum halide is selected from the group consisting of aluminum chloride and aluminum bromide. The complex can be formed from hydrocarbons other than those present in the reaction or from hydrocarbons which are introduced as feed or are produced in the isomerization reaction. The catalyst is a liquid and contains preferably from about 60 to about 70 weight percent aluminum halide as previously set forth.

The hydrocarbons which can be isomerized are alkanes containing 5 to 7 carbon atoms, namely, normal pentane, normal hexane and normal heptane. These materials can be isomerized either separately or in mixtures of two or more alkanes. The quantity of aromatics in the feed preferably does not exceed about 0.2 volume percent and the naphthenes not more than about 5 to 10 volume percent.

In accordance with the method of this invention it has been found that if the isomerization reaction is carried out in the presence of isobutane that not only can catalyst activity be maintained but the catalyst can also be increased in activity. Thus, if isobutane is utilized in the isomerization reaction it is possible to obtain a catalyst from the reaction which is more active and contains a higher percentage of aluminum chloride than the catalyst introduced to the reaction. In order to obtain this effect it is necessary that the isobutane be present in a mole ratio based on the quantity of normal paraffin in the feed of at least 1.1 to 1 and preferably at least 1.5 to 1. As higher concentrations of isobutane are provided the improvement in the catalyst activity is increased, however, usually it is not desirable to provide a greater concentration than about 5 moles per mole.

The alkylation of isobutane with ethylene is carried out in a conventional manner. This is a commercial process and is described in detail by Alden et al., Oil and Gas Journal, February 9, 1946. The alkylation process is usually operated with an external mole ratio of isobutane-to-olefin of from about 3:1 to about 8:1, preferably about 5:1. The reaction temperature is ordinarily in the range about 80 to about 150° F., and more usually from about 100 to about 130° F. In addition to the isobutane and ethylene the feed normally contains hydrocarbon impurities, such as, normal butane, propylene, ethane, propane, etc. For a more detailed description of the process reference can be had to the description in the Oil and Gas Journal.

In order to more clearly describe the invention and provide a better understanding thereof reference is had to the accompanying drawing which is a diagrammatic illustration of a combination alkylation and isomerization process. Referring to the drawing ethylene is combined through conduit 4 with a mixture of propane, normal butane and isobutane from conduit 2, and introduced through conduit 6 to alkylation zone 12. Before entering the alkylation zone the hydrocarbon feed mixture is increased by isobutane recycle from conduit 28. In addition to the hydrocarbons, aluminum chloride-hydrocarbon complex catalyst is introduced to the alkylation zone through conduits 68 and 10. This catalyst is recycle catalyst, which is increased in quantity as necessary by makeup catalyst introduced through conduit 8. In the alkylation zone 12, which is maintained at a temperature of about 120° F., the isobutane and ethylene react to form a mixture of higher molecular weight products. These products which are designated as alkylate are withdrawn from the alkylation zone through conduit 14 along with lower boiling material and unreacted isobutane. The reaction effluent enters a settling zone 16 wherein the catalyst settles and accumulates, being withdrawn through conduit 30. The hydrocarbon portion of the effluent is removed from the settling zone through conduit 18 and introduced to fractionation zone 20, which can be a conventional fractionating tower containing bubble trays. In zone 20 separation is effected between the lighter and heavier components to provide several product streams. The lowest boiling material, which comprises propane and lower boiling compounds, is removed through conduit 22. At other points in the fractionation zone isobutane is withdrawn through conduit 28 and recycled to the alkylation zone; and normal butane is withdrawn through conduit 24 and yielded from the unit. The remainder of the effluent, comprising alkylate, is yielded from the unit through conduit 42.

Separated catalyst, which is withdrawn from settling zone 16 through conduit 30, is divided, with a portion being recycled to the alkylation zone and the remainder introduced to isomerization zone 36. In addition, hydrogen chloride is introduced to zone 36 through conduit 64, to provide the desired concentration of this material in the reaction zone. The isomerization feed, in the instance normal heptane, is introduced to the isomerization reactor through conduit 38. Fresh isobutane and recycle isobutane are also introduced to the isomerization zone, through conduits 56 and 52 respectively. The isomerization reaction is carried out at a temperature of about 115° F. and a pressure of about 350 p.s.i. whereby the major portion of the normal heptane is converted to isoparaffins. In the process the aluminumm chloride-hydrocarbon complex catalyst, which was decreased in activity during the alkylation reaction, is reactivated by a reduction in the hydrocarbon content of the complex and is returned to its original pre-alkylation activity. Effluent from the isomerization zone passes through conduit 40 and into settling zone 42. Catalyst complex which accumulates in zone 42, is withdrawn through conduit 58 and is introduced to hydrogen chloride stripper 62. A portion of the catalyst is recycled to the isomerization zone through conduit 60. Hydrogen chloride recovered in the stripper is passed overhead through conduit 64 and returned to the isomerization zone. As necessary, make-up hydrogen chloride can be added to this system through conduit 66. The aluminum chloride-hydrocarbon catalyst complex, now restored in activity, is removed from the stripper and returned to the alkylation zone through conduits 68 and 10 as previously set forth.

The hydrocarbon portion of the isomerization effluent is removed from the settling zone and introduced to fractionation zone 46 through conduit 60. In the fractionation zone separations are performed similar to those carried out in fractionation zone 20. Hydrogen chloride is separated and recycled to the isomerization zone through conduit 47. Propane and lighter materials recovered from this zone are combined with the corresponding stream from fractionation zone 20 through conduit 48. The isobutane, which is withdrawn from the fractionation zone through conduit 52, is returned to the isomerization zone as previously described. Any normal butane present in the isomerization effluent is removed through conduit 50 and combined with normal butane from fractionation zone 20. The isomerizate, which comprises the desired product of the isomerization reaction, is removed from the fractionation zone and yielded from the unit through conduit 54.

The preceding discussion has been directed to preferred embodiment of the invention, however, this is not intended in any limited sense and it is within the scope of the invention to carry out the combined alkylation and isomerization process utilizing other conventional apparatus and process flows. For example if it is desired to combine the isomerizate and alkylate as a single product the functions performed by fractionation zones 22 and 62 can be combined and carried out in a single fractionation operation. Also a common isobutane makeup and recycle system can be utilized.

The following data are presented in illustration of a preferred embodiment of the invention.

EXAMPLE

Normal heptane was isomerized in the presence of isobutane, utilizing an aluminum chloride-hydrocarbon complex catalyst. The operating conditions employed and the results obtained are set forth in the table below.

*Table*

| | | | | | |
|---|---|---|---|---|---|
| i-$C_4$/n-$C_7$ mol ratio | 0.38 | 0.49 | 0.99 | 2.00 | 2.99 |
| Temperature, °F | 112 | 113 | 106 | 113 | 113 |
| Pressure, p.s.i | 335 | 430 | 280 | 320 | 240 |
| Stirring time, minutes | 15 | 15 | 15 | 15 | 15 |
| HCl/Catalyst volume ratio | 1.59 | 1.63 | 1.78 | 1.75 | 1.70 |
| HCl charged, lb./100 lb. feed | 8.5 | 8.4 | 8.7 | 9.0 | 8.9 |
| $AlCl_3$ in charge catalyst, percent | 62.8 | 62.8 | 62.8 | 62.8 | 62.8 |
| $AlCl_3$ in product catalyst, percent | 60.3 | 61.7 | 62.5 | 64.3 | 65.6 |
| Products, lb./100 lb. n-paraffin: | | | | | |
| Butane | 17.1 | 14.0 | 12.2 | −8.9 | −1.8 |
| Isopentane | 25.5 | 25.1 | 29.1 | 32.0 | 6.0 |
| Pentane | 3.0 | 4.2 | 3.0 | 3.5 | 2.1 |
| Neohexane | 6.3 | 7.7 | 10.7 | 6.0 | 4.1 |
| Isohexanes | 15.6 | 15.7 | 15.9 | 17.1 | 4.3 |
| Isoheptanes | 4.7 | 5.8 | 5.0 | 14.4 | 22.0 |
| Isoheptanes | 6.0 | 7.9 | 8.7 | 27.5 | 53.1 |
| Heptane | 2.3 | 2.8 | 2.3 | 4.8 | 17.8 |
| $C_8$+ | 13.0 | 14.4 | 12.1 | 9.2 | 4.7 |
| Hydrocarbon Complexed | 6.5 | 2.4 | 1.0 | −5.6 | −12.3 |
| n-$C_7$ Conversion, Percent | 96.7 | 97.2 | 97.7 | 95.2 | 82.2 |
| i-$C_7$ Efficiencies, Percent | 11.0 | 14.1 | 14.0 | 44.0 | 91.4 |
| $C_5$+ yield, lb./100 lb. n-$C_7$ | 76.4 | 83.6 | 86.6 | 114.5 | 114.1 |

The change in aluminum chloride content of the catalyst (concentration at the end of the run less the initial concentration) can be plotted as a function of the mole ratio of isobutane-to-normal heptane in the hydrocarbon feed. From such a plot it can be determined that the aluminum chloride content of the product catalyst begins to increase relative to the aluminum chloride content of the charge catalyst at isobutane-to-normal heptane ratios above about 1.1.

It is also noted from the data that at about the same ratio of isobutane-to-normal heptane, isobutane is consumed rather than produced in the isomerization reaction. The isobutane which is consumed is converted to higher hydrocarbons, thus increasing the yield of isomerizate (note that the $C_5$ plus yield increases from 86.8 at a ratio of isobutane-to-normal heptane of .99 to 114.5 at a isobutane-to-normal heptane ratio of 2.00). The presence of isobutane in the isomerization reaction therefore not only improves catalyst activity but also increases the quantity of higher isomers in the product.

Having thus described the invention by providing a specific example thereof, it is to be understood that no undue limitations or restrictions are to be drawn by reason thereof and many modifications and variations are within the scope of the invention.

We claim:

1. A combination process for the alkylation of isobutane with ethylene in a first zone and the isomerization of at least one alkane selected from the group consisting of normal pentane, normal hexane, and normal heptane at a temperature in the range of about 30 to about 150° F. in the presence of isobutane in a separate zone which comprises carrying out the process utilizing a common aluminum halide-hydrocarbon complex catalyst in which the aluminum halide is selected from the group consisting of aluminum chloride and aluminum bromide and providing a concentration of isobutane in the feed to the isomerization reaction of at least 1.1 to 1 mols per mol of alkane, catalyst being increased in activity by said isomerization and passed from the isomerization to the alkylation zone.

2. The process of claim 1 in which the aluminum halide is aluminum chloride.

3. The process of claim 1 in which the aluminum halide is aluminum bromide.

4. The process of claim 1 in which the alkane is normal pentane.

5. The process of claim 1 in which the alkane is normal hexane.

6. The process of claim 1 in which the alkane is normal heptane.

7. A combination process for the alkylation of isobutane with ethylene in a first zone and the isomerization of normal heptane at a temperature in the range of about 30 to about 150° F. in the presence of isobutane in a separate zone which comprises carrying out the process utilizing a common aluminum chloride-hydrocarbon complex catalyst and providing a concentration of isobutane in the feed to the isomerization reaction of from 1.1 to 5 moles per mol of normal heptane catalyst being increased in activity by said isomerization and passed from the isomerization zone to the alkylation zone and returned to said isomerization zone after use in said alkylation zone.

8. A combination process for the alkylation of isobutane with ethylene in a first zone and the isomerization of at least one alkane selected from the group consisting of normal pentane, normal hexane and normal heptane at a temperature in the range of about 30 to about 150° F. in the presence of isobutane in a separate zone which comprises carrying out the process utilizing a common aluminum chloride-hydrocarbon complex catalyst and providing a concentration of isobutane in the feed to the isomerization reaction of from 1.5 to 5 moles per mole of alkane catalyst being increased in activity by said isomerization and passed from the isomerization zone to the alkylation zone and returned to said isomerization zone after use in said alkylation zone.

9. The process of claim 8 in which the alkane is normal pentane.

10. The process of claim 8 in which the alkane is normal hexane.

11. The process of claim 8 in which the alkane is normal heptane.

12. A combination alkylation-isomerization process which comprises alkylating isobutane with ethylene in a first reaction zone in the presence of an aluminum chloride-hydrocarbon complex catalyst, separating catalyst from the alkylation effluent, introducing said catalyst with normal heptane and isobutane to a second reaction zone wherein the normal heptane is isomerized at a temperature in the range of about 30 to about 150° F., providing a concentration of isobutane in the feed to the second reaction zone of from 1.1 to 5 mols per mol of normal heptane, separating catalyst from the isomerization zone effluent and utilizing the separated catalyst as the catalyst in the alkylation zone.

References Cited in the file of this patent

UNITED STATES PATENTS

| | | |
|---|---|---|
| 2,200,090 | Evering et al. | Nov. 5, 1940 |
| 2,335,406 | Goldsby et al. | Nov. 30, 1943 |
| 2,355,198 | Atwell | Aug. 8, 1944 |
| 2,361,368 | Evering et al. | Oct. 31, 1944 |
| 2,398,563 | Smith et al. | Apr. 16, 1946 |
| 2,401,859 | Clarke | June 11, 1946 |
| 2,411,054 | Pevere | Nov. 12, 1946 |
| 2,425,268 | Sensel | Aug. 5, 1947 |